Patented Apr. 26, 1938

2,115,063

UNITED STATES PATENT OFFICE 2,115,063

PLUMBITE SOLUTIONS

Joseph E. Drapeau, Jr., Hammond, Ind., assignor to The Glidden Company, Cleveland, Ohio, a corporation of Ohio No Drawing. Application February 24, 1936, Serial No. 65,423

4 Claims. (Cl. 252—1)

This application is a continuation in part of my co-pending application Serial Number 32,931, filed July 24, 1935.

This invention relates to plumbite solutions of the type formed by dissolving lead oxide in caustic alkalies, and has particular reference to new plumbite solutions and the process of producing them, which comprises dissolving the lead oxide in caustic alkali solution in the presence of an agent which retards crystallization of lead oxide from the solutions. More particularly, it refers to plumbite solutions in which crystallization of lead oxide is retarded by the use of a very small percentage of metallic antimony, either in its pure state or as an alloy with lead.

Sodium plumbite, and other alkali plumbites, have been much used as "doctor" solutions for the removal of sulfur in the refining of petroleum oils. The solutions are ordinarily made by dissolving litharge in a caustic soda solution; and as a matter of conventional prior art practice, the solutions generally comprise 3.5 grams of litharge in 100 grams of 20° Baumé caustic soda solution, this being a saturated solution at about 20° C.

In order to reduce the cost of the refining operation, which depends largely on the lead content of the treating solution, it has been suggested that the concentration of lead in the caustic soda solution be increased by using battery scrap, treated so as to convert the antimonial lead of the scrap to litharge containing lead antimoniate (Kirk, United States Patent 1,977,993, October 23, 1934). This treatment does increase the lead solubility to a considerable degree, doubling the solubility, and permitting solutions containing 7.0 grams litharge per 100 grams of 20° Baumé caustic soda to be made. This method, however, introduces inerts such as lead sulfate and lead carbonate into the caustic soda solution to the extent of about 4–6%, causing carbonation of the caustic solution and sludging of the insoluble inerts. As a result, caustic is lost; and it is necessary to filter off the sludge.

I have discovered that apparently increased solubility of the litharge can be obtained, without the necessity for adding large quantities of impurities, by adding to the solution a small quantity of a catalyst comprising metallic antimony in small quantities. I have further investigated this apparently increased solubility, and have discovered that the effect is not an increase in solubility, but the production of stable supersaturated solutions.

When litharge is treated with caustic soda solution at 20° C., a solution of 3.5 grams per 100 grams of solution can be obtained. If the temperature be increased, the solubility becomes greater, the following table indicating the solubilities of litharge in 20° Baumé caustic soda solution, solubilities being expressed as grams litharge per 100 grams of solution.

Table 1—Solubility of litharge at various temperatures

| Temperature, ° C. | Solubility |
|---|---|
| 20 | 3.5 |
| 30 | 4.0 |
| 40 | 4.3 |
| 50 | 5.6 |
| 60 | 6.5 |
| 80 | 7.3 |
| 90 | 7.5 |
| 100 | 7.6 |

When litharge is treated with hot caustic solution, easy solubility is thus obtained, but as the temperature drops, crystallization occurs if too much litharge has been added.

If there be added to the litharge various addition agents, there is no change in the solubility at any given temperature. The following table illustrates this point:

Table 2—Solubility of litharge plus addition agents at 20° C.

| Grams litharge | Addition agent | Solubility in 100 grams 20° Baumé caustic soda |
|---|---|---|
| 10.0 | None | 3.50 |
| 10.0 | 0.25 tartaric acid | 3.55 |
| 10.0 | 0.25 dextrose | 3.55 |
| 10.0 | Litharge made by Kirk's process | 3.00 |

If, however, the same procedure as used for Table 2 be followed out, except that the litharge be treated at 100° C., and cooled to 20° C., the caustic soda solutions contain considerably higher percentages of litharge, as indicated in Table 3:

Table 3—Solubility of litharge plus addition agents, treating at 100° C. and cooling to 20° C.

| Grams litharge | Addition agent | Solubility in 100 grams 20° Baumé caustic soda |
|---|---|---|
| 10.0 | None | 3.60 |
| 10.0 | Kirk's process | 6.50 |
| 10.0 | 0.25 tartaric acid | 6.40 |
| 10.0 | 0.25 dextrose | 6.00 |

I believe the action of these agents, therefore, to be that of preventing crystallization, by stabilizing the super-saturated solution of lead oxide in caustic soda.

I have now discovered that metallic antimony exhibits this same tendency to increase the stability of super-saturated solutions of lead oxide in caustic soda, that the stabilization is obtainable with very small percentages of antimony, and that increasing the antimony percentage above 0.5% definitely decreases the solubility.

The following table indicates the results obtained with metallic antimony, using the same procedure as with Table 3:

Table 4—Effect of metallic antimony

| Grams litharge | Addition agent | Solubility in 100 grams 20° Baumé caustic soda |
|---|---|---|
| 10.0 | None | 3.60 |
| 10.0 | 0.00125 metallic antimony | 7.45 |
| 10.0 | 0.0025 metallic antimony | 7.40 |
| 10.0 | 0.005 metallic antimony | 7.55 |
| 10.0 | 0.010 metallic antimony | 7.60 |
| 10.0 | 0.025 metallic antimony | 7.50 |
| 10.0 | 0.050 metallic antimony | 7.50 |
| 10.0 | 0.075 metallic antimony | 7.25 |
| 10.0 | 0.15 metallic antimony | 6.80 |
| 10.0 | 0.5 metallic antimony | 5.50 |

It is apparent that the addition of amounts of metallic antimony above 0.5% definitely reduce the effect of the addition.

The addition agent may be added as metallic antimony, or as an alloy.

I claim:

1. A plumbite solution of high lead concentration containing a crystallizing retarder comprising metallic antimony distributed therein in amounts up to 0.5% based on the litharge content and in amounts sufficient to stabilize a supersaturated plumbite solution.

2. The method of making a high lead concentration plumbite solution which comprises dissolving litharge in caustic soda in the presence of metallic antimony in amounts sufficient to stabilize a supersaturated plumbite solution.

3. The method of claim 2 in which the amount of antimony is of the order of 0.5% by weight of the litharge present.

4. The method of claim 2 in which the amount of antimony is 0.00125–0.5% by weight of the litharge present.

JOSEPH E. DRAPEAU, Jr.